United States Patent
Shibata

(10) Patent No.: US 8,753,017 B2
(45) Date of Patent: Jun. 17, 2014

(54) SEALING DEVICE AND ROLLING BEARING UNIT

(71) Applicant: JTEKT Corporation, Osaka (JP)

(72) Inventor: Hideo Shibata, Kashiba (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/790,639

(22) Filed: Mar. 8, 2013

(65) Prior Publication Data

US 2013/0243359 A1    Sep. 19, 2013

(30) Foreign Application Priority Data

Mar. 16, 2012   (JP) .................................. 2012-059567

(51) Int. Cl.
*F16C 33/76*     (2006.01)

(52) U.S. Cl.
USPC ........................................................ 384/486

(58) Field of Classification Search
USPC ................. 384/477, 478, 481, 482, 484–486; 277/353, 551, 562, 572–577
See application file for complete search history.

(56) References Cited

U.S. PATENT DOCUMENTS

| | | | |
|---|---|---|---|
| 2,249,141 A | | 7/1941 | Johnson |
| 3,550,974 A | * | 12/1970 | Kupchick ....................... 384/480 |
| 4,721,314 A | * | 1/1988 | Kanayama et al. ............ 277/576 |
| 4,874,261 A | | 10/1989 | Colanzi et al. |
| 7,926,816 B2 | * | 4/2011 | Shibayama et al. .......... 277/551 |
| 2009/0058011 A1 | | 3/2009 | Shibayama et al. |
| 2010/0046873 A1 | * | 2/2010 | Takimoto et al. ............. 384/478 |

FOREIGN PATENT DOCUMENTS

| | | |
|---|---|---|
| EP | 0 317 903 A1 | 5/1989 |
| EP | 0 807 775 A1 | 11/1997 |
| EP | 0 864 770 A1 | 9/1998 |
| EP | 2 085 667 A1 | 8/2009 |
| JP | A-2000-145799 | 5/2000 |
| JP | A-2005-257015 | 9/2005 |
| JP | 2009014181 A * | 1/2009 |

OTHER PUBLICATIONS

Jul. 30, 2013 Extended European Search Report issued in European Patent Application No. 13158767.7.

* cited by examiner

*Primary Examiner* — Phillip A Johnson
(74) *Attorney, Agent, or Firm* — Oliff PLC

(57) ABSTRACT

Through-holes are formed in an axially intermediate portion of a cylindrical portion of a first metal core, at predetermined intervals in a circumferential direction, and the through-holes pass through the cylindrical portion in a radial direction. A first elastic seal has a lip that is in sliding contact with an outer peripheral face of a cylindrical portion of a second metal core, a first cylindrical portion that is in close contact with an inner peripheral face of an axially inner-side portion of the cylindrical portion of the first metal core, a second cylindrical portion that is in close contact with an outer peripheral face of an axially outer-side portion of the cylindrical portion of the first metal core, and connecting pieces that are inserted into the through-holes of the cylindrical portion of the first metal core and that connect the first cylindrical portion with the second cylindrical portion.

6 Claims, 4 Drawing Sheets

SEALING DEVICE AND ROLLING BEARING UNIT

INCORPORATION BY REFERENCE

The disclosure of Japanese Patent Application No. 2012-059567 filed on Mar. 16, 2012 including the specification, drawings and abstract, is incorporated herein by reference in its entirety.

BACKGROUND OF THE INVENTION

1. Field of the Invention

The invention relates to a sealing device and a rolling bearing unit, and more specifically to a sealing device suitable for a rolling bearing unit that is used in an environment in which water is likely to enter the rolling bearing unit from the outside, such as a bearing unit for a wheel of a vehicle and a rolling bearing unit including such a sealing device.

2. Description of Related Art

In a rolling bearing unit used in a hub unit for a vehicle, a sealing device called a pack seal is commonly used. Such a sealing device usually includes a first metal core having a generally L-shaped cross section, an elastic seal, and a second metal core (slinger) having a generally L-shaped cross section. The first metal core has a cylindrical portion that is fitted to an outer ring. The elastic seal is attached to the first metal core. The second metal core has a cylindrical portion that is fitted to an inner ring. The elastic seal is in sliding contact with the second metal core, and a small clearance (clearance for a labyrinth seal) is formed between the cylindrical portion of the first metal core and an outer peripheral edge of the second metal core.

Due to presence of the clearance between the cylindrical portion of the first metal core and the outer peripheral edge of the second metal core (due to the non-contact type seal configuration), there is a problem that water is likely to enter the rolling bearing unit. In order to address the problem, Japanese Patent Application Publication No. 2005-257015 (JP 2005-257015 A) proposes a sealing device with a configuration in which part of an elastic seal and a sliding ring joined to the part of the elastic seal are provided between the cylindrical portion of the first metal core and the outer peripheral edge of the second metal core.

In the sealing device described in JP 2005-257015 A, although the sealing performance is improved by filling the clearance (by realizing contact-type seal configuration), there is a problem that manufacturing and assembly of the sealing device become cumbersome because the sliding ring, which is not used in a conventional sealing device, is required.

SUMMARY OF THE INVENTION

It is an object of the invention to provide a sealing device that has a contact-type seal configuration which is realized without making manufacturing and assembly of the sealing device cumbersome, and a rolling bearing unit having such a sealing device.

An aspect of the invention relates to a sealing device, including: a first metal core that has a generally L-shaped cross section, and has a cylindrical portion that is fitted to an outer ring; a first elastic seal that is attached to the first metal core; a second metal core that has a generally L-shaped cross section, and has a cylindrical portion that is fitted to an inner ring; and a second elastic seal that is attached to the second metal core. A plurality of through-holes is formed in an axially intermediate portion of the cylindrical portion of the first metal core, at predetermined intervals in a circumferential direction, and the through-holes pass through the cylindrical portion in a radial direction. The first elastic seal has a lip that is in sliding contact with an outer peripheral face of the cylindrical portion of the second metal core, a first cylindrical portion that is in close contact with an inner peripheral face of an axially inner-side portion of the cylindrical portion of the first metal core, a second cylindrical portion that is in close contact with an outer peripheral face of an axially outer-side portion of the cylindrical portion of the first metal core, and a plurality of connecting pieces that are inserted into the through-holes of the cylindrical portion of the first metal core and that connect the first cylindrical portion with the second cylindrical portion. The second elastic seal has a lip that is in sliding contact with an inner peripheral face of the axially outer-side portion of the cylindrical portion of the first metal core.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
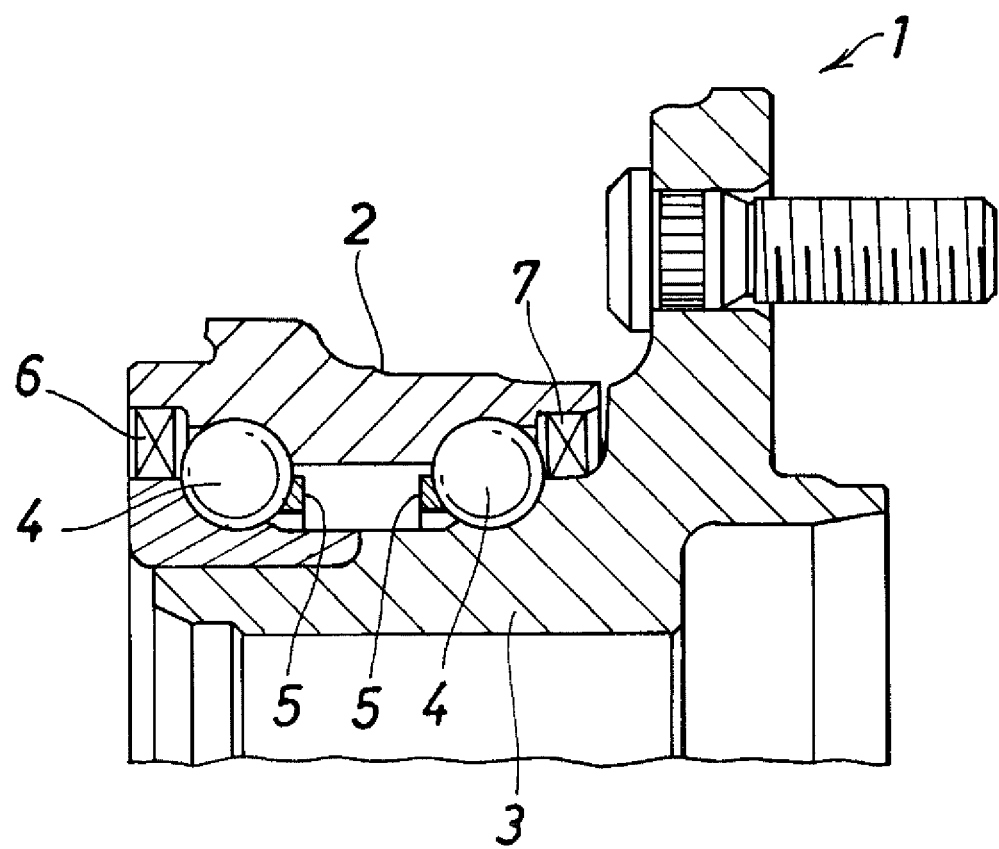
FIG. 1 is a longitudinal sectional view showing a rolling bearing unit according to an embodiment of the invention.

FIG. 1 shows a rolling bearing unit to which each of a sealing device according to a first embodiment of the invention and a sealing device according to a second embodiment of the invention is applied.

A rolling bearing unit 1 is suitably used in, for example, a hub unit for a vehicle. The rolling bearing unit 1 includes an outer ring 2, an inner ring 3, a plurality of balls (rolling elements) 4, cages 5, and sealing devices 6, 7. The balls 4 are arranged in two rows between the outer ring 2 and the inner ring 3. The cages 5 hold the balls 4. The sealing device 6 is disposed between the outer ring 2 and the inner ring 3, at a position on the inboard side, and the sealing device 7 is disposed between the outer ring 2 and the inner ring 3, at a position on the outboard side.

Figure 2:
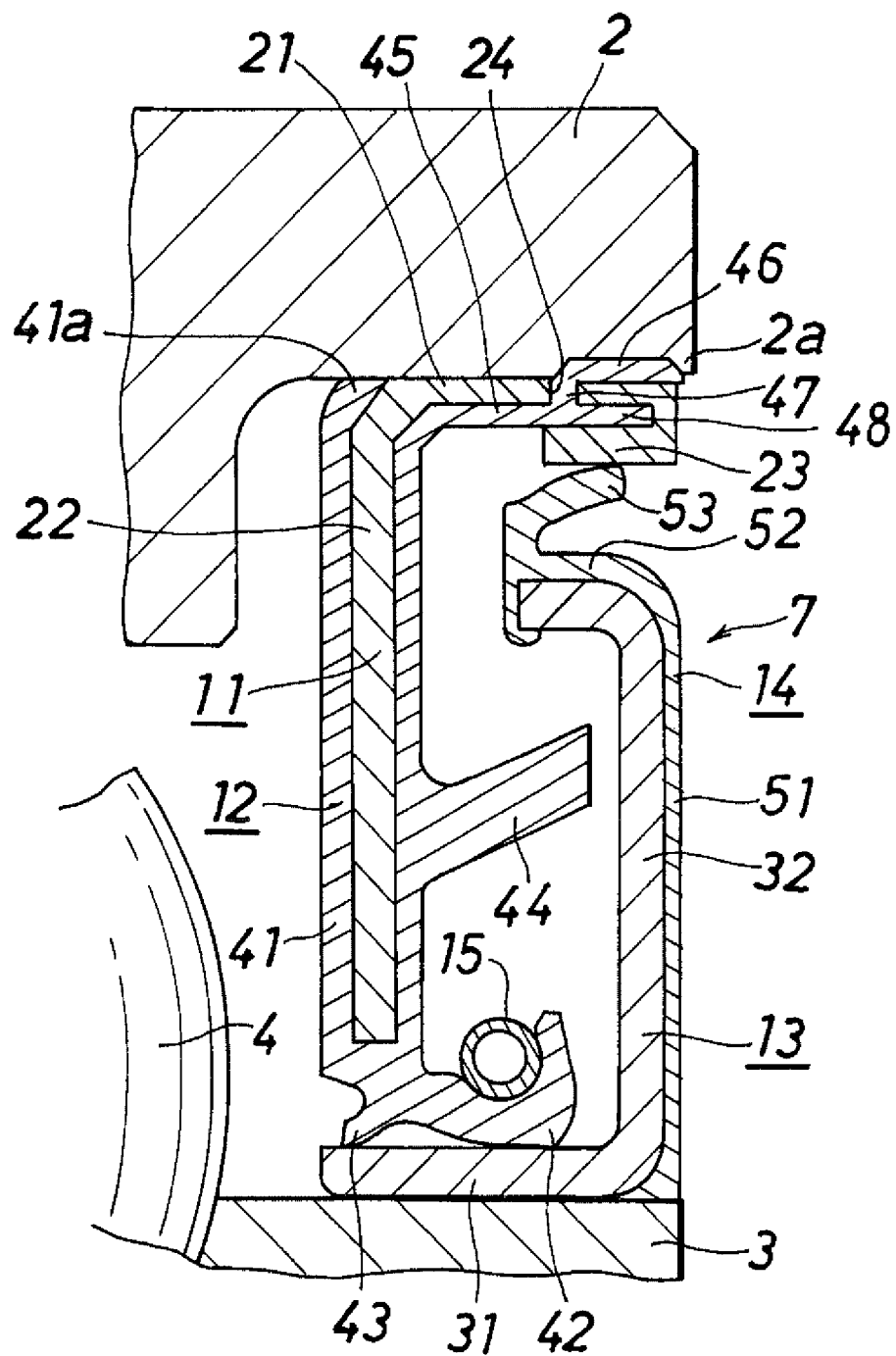
FIG. 2 is a longitudinal sectional view showing a sealing device according to a first embodiment of the invention.

FIG. 2 shows the sealing device 7 according to the first embodiment of the invention.

The sealing device 7 includes a first metal core 11 having a generally L-shaped cross section, a first elastic seal 12, a second metal core 13 having a generally L-shaped cross section, and a second elastic seal 14. The first metal core 11 is attached to the outer ring 2. The first elastic seal 12 is attached to the first metal core 11. The second metal core 13 is attached to the inner ring 3. The second elastic seal 14 is attached to the second metal core 13.

The first metal core 11 has a cylindrical portion 21, an annular portion 22, and a folded-back portion 23. The cylindrical portion 21 is fitted to the outer ring 2. The annular portion 22 extends radially inward from an end portion of the cylindrical portion 21, the end portion being on the inner side in the axial direction (inboard side). The folded-back portion 23 is connected to an end portion of the cylindrical portion 21, the end portion being on the outer side in the axial direction (outboard side), and folded back toward the axially inner side. A plurality of through-holes 24 is formed in an axially intermediate portion of the cylindrical portion 21 at predetermined intervals in the circumferential direction so as to pass through the cylindrical portion 21 in the radial direction. The folded-back portion 23 is substantially parallel to the cylindrical portion 21, and part of the first elastic seal 12, that is, an axially outer-side extending portion 48 (described later) is inserted between the folded-back portion 23 and the cylindrical portion 21.

The second metal core 13 has a cylindrical portion 31 and an annular portion 32. The cylindrical portion 31 is fitted to the inner ring 3. The annular portion 32 extends radially outward from an end portion of the cylindrical portion 31, the end portion being on the outer side in the axial direction.

The first elastic seal 12 has a U-shaped base portion 41, two radial lips 42, 43, and one axial lip 44. The U-shaped base portion 41 is provided so as to surround the annular portion 22 of the first metal core 11 from both axial sides and from the radially inner side. The radial lips 42, 43 are formed at a radially inner-side edge of the base portion 41. The axial lip 44 is formed at a radially intermediate location of an axially outer-side portion of the base portion 41. The two radial lips 42, 43 are a main lip 42 and a sub-lip 43. The main lip 42 is urged by a spring 15 radially inward and strongly pressed onto the cylindrical portion 31 of the second metal core 13. The sub-lip 43 is lightly pressed onto the cylindrical portion 31 of the second metal core 13 under its own elastic force, A radially outer-side edge of an axially inner-side portion of the base portion 41 is formed so as to closely contact both a corner portion of the first metal core 11 (a portion at the boundary between the cylindrical portion 21 and the annular portion 22), and an inner peripheral face of the outer ring 2.

The first elastic seal 12 further has a first cylindrical portion 45 and a second cylindrical portion 46. The first cylindrical portion 45 is connected to a radially outer-side edge of an axially outer-side portion of the base portion 41 and extends axially outward. The second cylindrical portion 46 is connected to the first cylindrical portion 45 via connecting pieces 47.

The first cylindrical portion 45 is in close contact with an inner peripheral face of an axially inner-side portion of the cylindrical portion 21 of the first metal core 11, thereby preventing entry of water from the outside of the sealing device 7. The second cylindrical portion 46 is in close contact with an outer peripheral face of an axially outer-side portion of the cylindrical portion 21 of the first metal core 11. The connecting pieces 47 are inserted in the through-holes 24 of the cylindrical portion 21 of the first metal core 11. The first cylindrical portion 45 has the axially outer-side extending portion 48 that is located axially outward of portions where the connecting pieces 47 are formed, and is held between the cylindrical portion 21 and the folded-back portion 23 of the first metal core 11.

The second elastic seal 14 has an annular portion 51, a cylindrical portion 52, and a radial lip 53. The annular portion 51 is in close contact with an axially outer-side face of the annular portion 32 of the second metal core 13. The cylindrical portion 52 is in close contact with a radially outer-side face of a radially outer-side cylindrical portion of the second metal core 13. The radial lip 53 extends obliquely toward the folded-back portion 23 of the cylindrical portion 21 of the first metal core 11 from an axially inner-side end portion of the cylindrical portion 52.

The radial lips 42, 43 of the first elastic seal 12 are in sliding contact with an outer peripheral face of the cylindrical portion 31 of the second metal core 13. The radial lip 53 of the second elastic seal 14 is in sliding contact with an inner peripheral face of the folded-back portion 23 of the cylindrical portion 21 of the first metal core 11. Thus, a contact-type seal without a clearance is formed.

The outer peripheral face of the cylindrical portion 31 of the second metal core 13, with which the first elastic seal 12 is in sliding contact, and an inner peripheral face of an axially outer-side portion of the cylindrical portion 21 of the first metal core 11, with which the second elastic seal 14 is in sliding contact, are both metallic faces (portions where the elastic seals 12, 14 are not provided). Accordingly, problems such as friction and abrasion due to contact between the elastic seals 12, 14 are avoided. In a case where the first elastic seal 12 is provided only on an outer peripheral face of the cylindrical portion 21 of the first metal core 11 in order to avoid the problems such as friction and abrasion, another problem that the first elastic seal 12 comes off easily from the first metal core 11 arises. However, such a problem is avoided according to the present embodiment because the first cylindrical portion 45 and the second cylindrical portion 46 of the first elastic seal 12 are connected to each other via the connecting pieces 47.

The connecting pieces 47 of the first elastic seal 12 are formed when rubber for forming the first elastic seal 12 flows into the through-holes 24 of the cylindrical portion 21 of the first metal core 11 due to heating during cure adhesion for causing the first elastic seal 12 to adhere to the first metal core 11.

Figure 3:
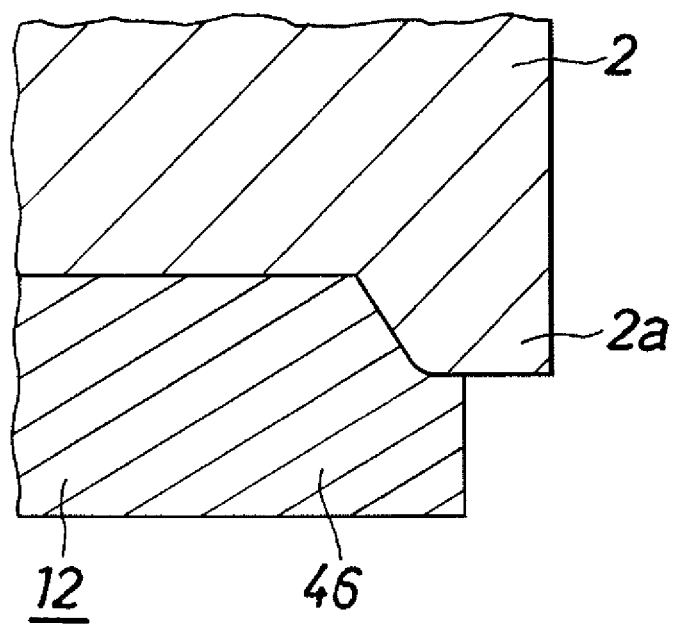
FIG. 3 is an enlarged longitudinal sectional view showing part of the sealing device shown in FIG. 2.

As shown in an enlarged view in FIG. 3, the outer ring 2 has an annular projecting portion 2a which is brought into close contact with an end portion of the second cylindrical portion 46 of the first elastic seal 12 from the axially outer side. Thus, the sealing device 7 is less likely to be removed from the outer ring 2, and the adhesion between the outer ring 2 and the sealing device 7 is enhanced.

As explained so far, with the sealing device 7 according to the present embodiment, it is possible to obtain the sealing device 7 that has a contact-type seal configuration which is realized without making manufacturing and assembly of the sealing device cumbersome.

Figure 4:
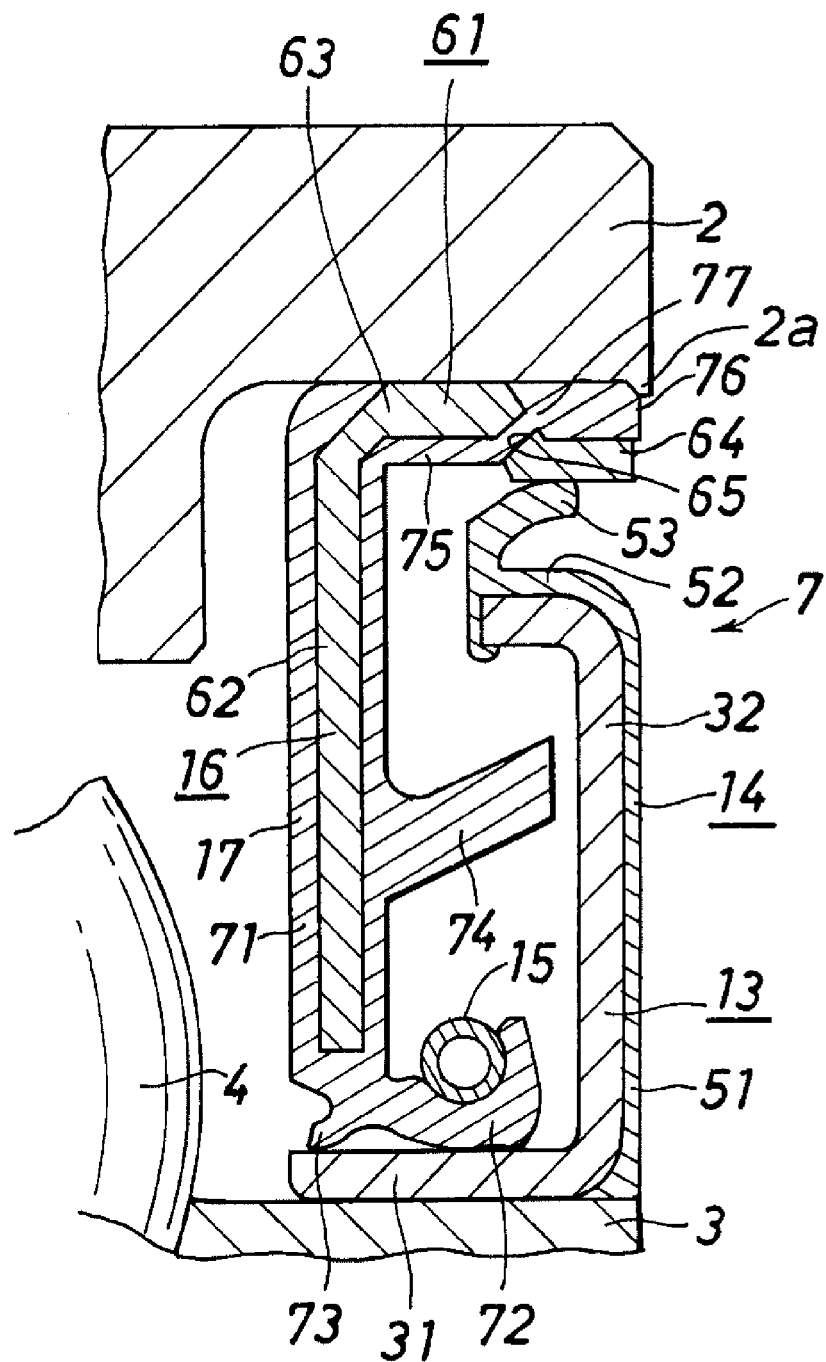
FIG. 4 is a longitudinal sectional view showing a sealing device according to a second embodiment of the invention.

FIG. 4 shows the sealing device 7 according to a second embodiment of the invention.

The sealing device 7 includes a first metal core 16 having a generally L-shaped cross section, a first elastic seal 17, the second metal core 13 having a generally L-shaped cross section, and the second elastic seal 14. The first metal core 16 is attached to an outer ring 2. The first elastic seal 17 is attached to the first metal core 16. The second metal core 13 is attached to an inner ring 3. The second elastic seal 14 is attached to the second metal core 13.

The second metal core 13 and the second elastic seal 14 are the same as those described in the first embodiment.

The first metal core 16 has a cylindrical portion 61 and an annular portion 62. The cylindrical portion 61 is fitted to the outer ring. The annular portion 62 extends radially inward from an end portion of the cylindrical portion 61, the end portion being on the inner side in the axial direction. The cylindrical portion 61 has a large-diameter portion 63 and a small-diameter portion 64 that is located axially outward of the large-diameter portion 63. The small-diameter portion 64 is connected to an axially outer-side end portion of the large-diameter portion 63 and extends axially outward. The outer diameter and the inner diameter of the small-diameter portion 64 are both smaller than those of the large-diameter portion

63. A plurality of through-holes 65 is formed in a portion at the boundary between the large-diameter portion 63 and the small-diameter portion 64 at predetermined intervals in the circumferential direction. The through-holes 65 pass through the cylindrical portion 61.

The first elastic seal 17 has a U-shaped base portion 71, two radial lips 72, 73, and one axial lip 74. The base portion 71 is formed so as to surround the annular portion 62 of the first metal core 16 from both axial sides and from the radially inner side. The radial lips 72, 73 are formed at a radially inner-side edge of the base portion 71. The axial lip 74 is formed at a radially intermediate location of an axially outer-side portion of the base portion 71. The two radial lips 72, 73 are a main lip 72 and a sub-lip 73. The main lip 72 is urged by the spring 15 radially inward and pressed strongly onto the cylindrical portion 31 of the second metal core 13. The sub-lip 73 is lightly pressed onto the cylindrical portion 31 of the second metal core 13 under its own elastic force.

The elastic seal 17 further has a first cylindrical portion 75 and a second cylindrical portion 76. The first cylindrical portion 75 is connected to a radially outer-side edge of an axially outer-side portion of the base portion 71 and extends in the axial direction. The second cylindrical portion 76 is connected to the first cylindrical portion 75 via connecting pieces 77.

The first cylindrical portion 75 is in close contact with an inner peripheral face of the large-diameter portion 63 that is an axially inner-side portion of the cylindrical portion 61 of the first metal core 16. The second cylindrical portion 76 is in close contact with an outer peripheral face of the small-diameter portion 64 that is an axially outer-side portion of the cylindrical portion 61 of the first metal core 16. The connecting pieces 77 are inserted into the through-holes 65 that are located in the portion at the boundary between the large-diameter portion 63 and the small-diameter portion 64 of the cylindrical portion 61 of the first metal core 16. As in the first embodiment, the outer ring 2 has an annular projecting portion 2a that is brought into close contact with an end portion of the second cylindrical portion 76 of the first elastic seal 17 from the axially outer side. Thus, the sealing device 7 is less likely to be removed from the outer ring 2, and the adhesion between the outer ring 2 and the sealing device 7 is enhanced.

With the sealing device 7 according to the second embodiment, it is possible to omit the folded-back portion 23 of the first metal core 11 in the first embodiment, while maintaining advantageous characteristics of the first embodiment. In this way, it is possible to obtain the sealing device 7 having a contact-type seal configuration which is realized without making manufacturing and assembly of the sealing device cumbersome.

The foregoing description is made on the sealing device 7. However, the configurations of the sealing device 7 shown in FIG. 2 to FIG. 4 may be applied to either one of or both of the sealing devices 6, 7 in FIG. 1.

With the sealing device and the rolling bearing unit according to the invention, the sealing performance is remarkably improved because the contact-type seal configuration is realized. Moreover, constituent elements are only metal cores and elastic seals that are commonly used for this type of sealing devices. Therefore, it is possible to prevent manufacturing and assembly of the rolling bearing unit from becoming cumbersome.

What is claimed is:

1. A sealing device, comprising:
a first metal core that has a generally L-shaped cross section, and has a cylindrical portion;
a first elastic seal that is attached to the first metal core;
a second metal core that has a generally L-shaped cross section, and has a cylindrical portion; and
a second elastic seal that is attached to the second metal core, wherein
a plurality of through-holes is formed in an axially intermediate portion of the cylindrical portion of the first metal core, at predetermined intervals in a circumferential direction, and the through-holes pass through the cylindrical portion of the first metal core in a radial direction,
the first elastic seal has a lip that is in sliding contact with an outer peripheral face of the cylindrical portion of the second metal core, a first cylindrical portion that is in close contact with an inner peripheral face of an axially inner-side portion of the cylindrical portion of the first metal core, a second cylindrical portion that is in close contact with an outer peripheral face of an axially outer-side portion of the cylindrical portion of the first metal core, and a plurality of connecting pieces that are inserted into the through-holes of the cylindrical portion of the first metal core and that connect the first cylindrical portion with the second cylindrical portion, and
the second elastic seal has a lip that is in sliding contact with an inner peripheral face of the axially outer-side portion of the cylindrical portion of the first metal core, and an end portion of the cylindrical portion of the first metal core is bent in an inward radial direction so as to contact the lip of the second elastic seal.

2. The sealing device according to claim 1, wherein:
a folded-back portion that extends axially inward is formed at an end portion of the cylindrical portion of the first metal core; and
the first cylindrical portion of the first elastic seal has an axially outer-side extending portion that is held between the cylindrical portion of the first metal core and the folded-back portion.

3. The sealing device according to claim 1, wherein:
the cylindrical portion of the first metal core has a large-diameter portion that has an inner peripheral face, with which the first cylindrical portion of the first elastic seal is in close contact, and that is fitted to the outer ring, and a small-diameter portion that has an outer peripheral face, with which the second cylindrical portion of the first elastic seal is in close contact, and that has an outer diameter and an inner diameter respectively smaller than an outer diameter and an inner diameter of the large-diameter portion; and
the through-holes of the cylindrical portion of the first metal core are formed in a portion at a boundary between the large-diameter portion and the small-diameter portion.

4. A rolling bearing unit, comprising:
an inner ring;
an outer ring;
a plurality of rolling elements; and
a sealing device disposed at at least one of a position between one end portion of the outer ring and one end portion of the inner ring and a position between the other end portion of the outer ring and the other end portion of the inner ring, wherein
the sealing device is the sealing device according to claim 1, and
the outer ring has an annular projecting portion that is in close contact with an end portion of the second cylindrical portion of the first elastic seal from an axially outer side.

5. A rolling bearing unit, comprising:
an inner ring;
an outer ring;
a plurality of rolling elements; and
a sealing device disposed at at least one of a position between one end portion of the outer ring and one end portion of the inner ring and a position between the other end portion of the outer ring and the other end portion of the inner ring, wherein
the sealing device is the sealing device according to claim 2, and
the outer ring has an annular projecting portion that is in close contact with an end portion of the second cylindrical portion of the first elastic seal from an axially outer side.

6. A rolling bearing unit, comprising:
an inner ring;
an outer ring;
a plurality of rolling elements; and
a sealing device disposed at at least one of a position between one end portion of the outer ring and one end portion of the inner ring and a position between the other end portion of the outer ring and the other end portion of the inner ring, wherein
the sealing device is the sealing device according to claim 3, and
the outer ring has an annular projecting portion that is in close contact with an end portion of the second cylindrical portion of the first elastic seal from an axially outer side.

* * * * *